United States Patent Office.

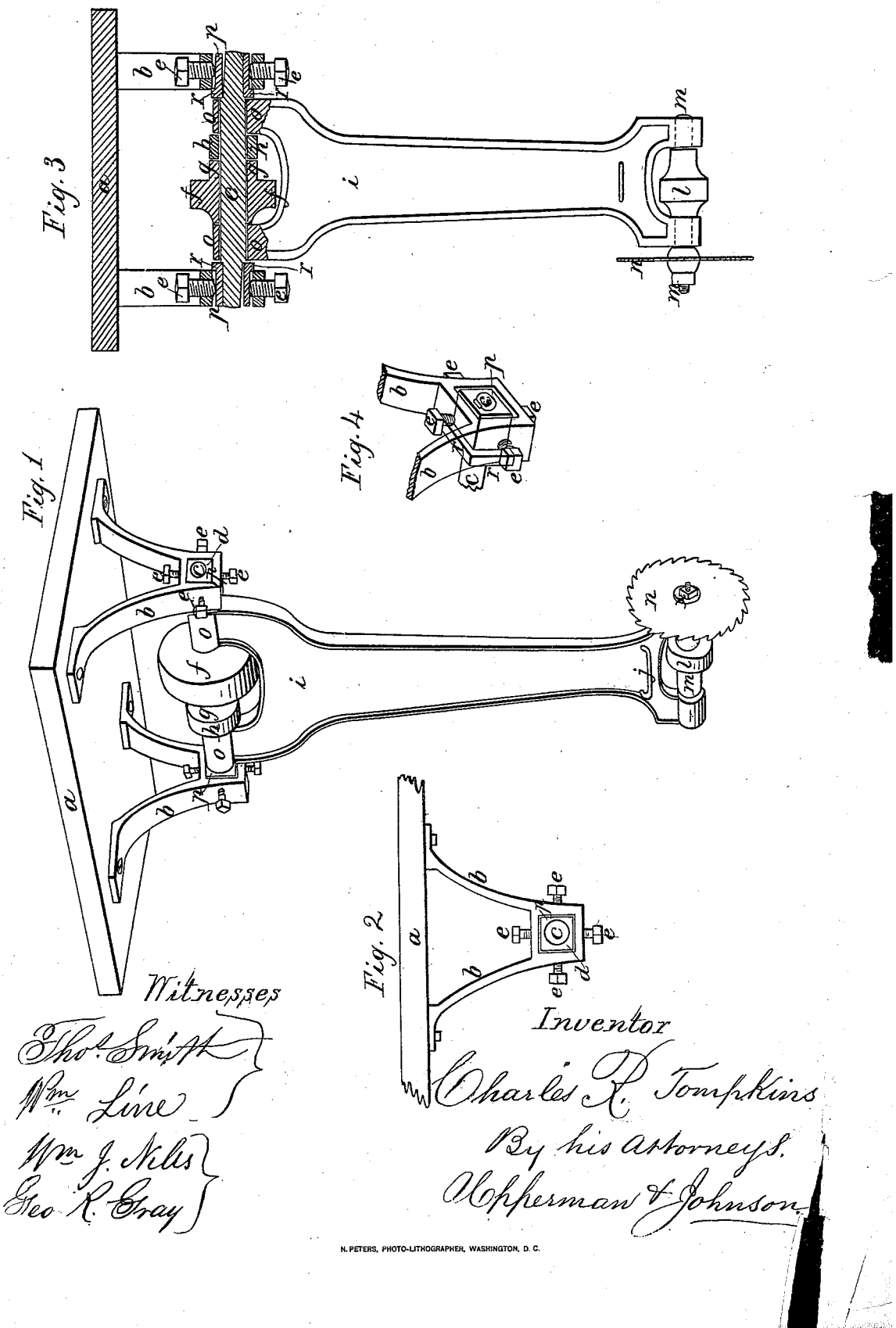

CHARLES R. TOMPKINS, OF ROCHESTER, NEW YORK.

Letters Patent No. 94,255, dated August 31, 1869.

IMPROVEMENT IN HANGING CIRCULAR-SAWS.

The Schedule referred to in these Letters Patent and making part of the same.

*To all whom it may concern:*

Be it known that I, CHARLES R. TOMPKINS, of Rochester, in the county of Monroe, and State of New York, have invented certain new and useful Improvements in Cut-Off Saws; and I do hereby declare the following to be a full, clear, and exact description thereof, reference being had to the accompanying drawings of the same, which make part of this specification, and in which—

Figure 1 represents a view in perspective of the rear side of the frame of a cut-off saw, embracing my improvements;

Figure 2 represents an end view of the hanger, showing the flanged square block for locking the shaft to the hanger;

Figure 3 represents a section showing the connection of the swinging saw-frame with its fixed shaft, its flanged locking-blocks, and the loose driving-pulleys thereon; and Figure 4 represents a view in perspective of one of the square-flanged locking-blocks of the fixed shaft.

The hinged hanging cut-off saw, as heretofore constructed, has been mounted upon a revolving shaft, so that the bearings of the arms of the saw-frame were liable to constant wear, and would soon become loose upon the shaft, and consequently the saw and its frame would become unsteady and wabbling in their motion, and would not, therefore, cut true, but would leave the cut edges of the material either rough and irregular, or not square and true, which defect rendered this valuable machine an entire failure.

To render this machine of practical usefulness, and to obviate the defects which have heretofore rendered it useless, is the object of my improvement.

Self-adjusting journal-boxes and bearings have long been known and used, but such devices are inapplicable to a cut-off saw-frame. Neither is any self-adjustment required nor desirable in connection with a swinging pendant saw-frame, because it would render such saw-frame too uncertain and unstable, and would be of no use whatever, as stability and a fixed adjustment are required in such a saw-frame.

My improvements, therefore, do not relate to adjustable bearings, nor to any means of adjustment of the journal-boxes, but to hanging the pendent saw-frame upon a fixed shaft, so as to avoid wear in the bearings, and a wabbling and irregular motion of the saw, in connection with the square flanged blocks for locking and adjusting the saw and frame by a fixed or motionless shaft, and the arrangement of loose driving-pulleys thereon, whereby certain advantages and results are obtained, which impart to an otherwise valueless machine great utility, durability, and cheapness.

In order to show the advantages resulting from my improvement, it may be stated that in this machine as heretofore made, the arms *o o*, of the saw-frame *i*, were supported upon a revolving shaft, and the weight of the metallic frame or beam and saw upon a rapidly-revolving shaft would soon wear away the interior bearings of the arms, and the correspondingly adjacent surface of the shaft, and the frame would thereby twist and wabble, and cause the saw to vary from a right line, while the bearings of the revolving shaft would also wear, and thus increase the difficulty produced by the wear of the bearings of the arms. Neither could this defect be remedied by making the joints close, for that would produce a loss of power, and the friction, consequent heat, which would soon destroy the bearings entirely.

The machine, therefore, under the weight of these serious defects in construction, went out of use, but by my improvement its utility is complete, and its advantages in simplicity, durability, and cheapness of construction render it superior to the railway-saw now in general use.

In the accompanying drawings, the saw-frame or beam *i* is of the usual construction, having forked arms, *o o*, at its upper end, and carrying, at its lower end, the mandrel *m* of the cut-off saw *n*.

The forked arms *o o* are provided with cylindrical bearings, which are fitted closely upon a fixed horizontal shaft, *c*, so as to allow the saw-frame to swing back and forth thereon, in a vertical position, and as this swinging movement of the frame is only while the saw is cutting through the material, there will be no perceptible wear upon the bearings of the arms.

The fixed shaft *c* is secured in blocks *p*, supported in hangers *b*, which are firmly bolted to any convenient support overhead.

The shaft, though fixed in its position, that is, having no revolving motion, is, nevertheless, capable of adjustment, for the purpose of adjusting the pendant saw-frame perfectly square with a guide on the bench, upon which the material to be cut is placed. The ends of the shaft, therefore, are mounted in square blocks, keyed permanently thereto, so that the shaft cannot turn in them.

These square blocks *p* are provided with flanges or ribs, *r*, which surround the inner ends of the blocks, so as to fit against the inner sides of the hangers, as shown in figs. 3 and 4, for the purpose of locking them to the hangers, and prevent any axial movement of the shaft, while the shaft itself is locked to the blocks, so that the two are locked together, and may be adjusted within the square openings of the hangers.

The locking-blocks *p* are secured in correspondingly-shaped openings in the lower ends of the hangers *b*, and these openings are larger than the blocks *p*, for the purpose of allowing the adjustment of the latter. This adjustment is effected by four screw-bolts, *e*, passing through the four opposite sides of the hanger, so as to bear against the four corresponding sides of the blocks $p$, and thus adjust the ends of the shaft to the right or left, and up or down, as may be required to bring the saw to cut true and square.

This adjustment, however, is only necessary when the machine is put up for use, and at any time thereafter, when from any cause the saw may not cut the material perfectly square, but when once made, it is fixed and the shaft is held secure from turning.

The driving-pulleys $f$ and $g$ are secured to one hub, and are placed and revolve upon the shaft $c$, between the forked arms $o\ o$ of the saw-frame.

A loose pulley, $h$, is also placed upon the shaft $c$, so as to revolve upon it, and is used only to run the belt from the pulley $g$ when the saw is not in motion.

The operation of the machine is as follows:

A belt is run from the driving-power to the pulley $g$, and from pulley $f$ a band leads to a pulley, $l$, and thus communicates motion to the saw.

A suitable bench is arranged to support the material to be cut beneath the saw, and the operator, while holding the material with his left hand, with his right draws the saw forward, by means of a handle attached to the lower end of the pendent frame, and thus the material is cut.

On the rear side of the frame a cord is attached to a loop, $j$, passed over a pulley, and has a weight secured to it for the purpose of drawing the saw and frame back out of the way when not cutting, and to allow the operator to move the material forward without coming in contact with the saw.

This arrangement being common to machines of this kind, is not, therefore, represented in the drawings.

Having described my improvement, I do not claim as my invention self-adjusting devices for bearings or journal-boxes of any description whatever; neither do I claim the set-screws, nor their arrangement for adjusting the fixed shaft of the saw-frame; but

I claim—

1. The shaft $c$, when secured at either end to square blocks $p$, for the purpose of preventing it from turning, while at the same time admitting of the adjustment of said shaft in the manner and for the purpose before described.

2. The swinging frame $i$, the fixed shaft $c$, the loose pulleys $f\ g\ h$, and the square-flanged locking-blocks $p$, of a cut-off saw, constructed, arranged, and operating in the manner and for the purpose before described.

CHAS. R. TOMPKINS.

Witnesses:
THOS. SMITH,
WM. LINE.